United States Patent [19]
Best

[11] Patent Number: 5,551,609
[45] Date of Patent: Sep. 3, 1996

[54] BICYCLE RACK WITH INTEGRAL LOCK HOLDER

[76] Inventor: Paul S. Best, 410 Whitney Ave., New Haven, Conn. 06511

[21] Appl. No.: 476,602

[22] Filed: Jun. 6, 1995

Related U.S. Application Data

[63] Continuation-in-part of Ser. No. 239,534, May 9, 1994, abandoned.

[51] Int. Cl.$^6$ .................................................. B62J 11/00
[52] U.S. Cl. .................... 224/440; 224/935; 224/456; 224/462; 403/374
[58] Field of Search ..................... 224/30 R, 42, 224/35, 32 A, 37, 38, 39, 40, 31, 42; 403/342, 373, 374, 392, 396, 400; 211/89; 248/109, 321, 316.7, 221.3; 70/233

[56] References Cited

U.S. PATENT DOCUMENTS

| | | | |
|---|---|---|---|
| 3,975,805 | 8/1976 | Spurling et al. | 403/374 |
| 4,154,382 | 5/1979 | Blackburn | 224/39 |
| 4,350,361 | 9/1982 | Fujii | 224/30 R |
| 4,383,625 | 5/1983 | Kiang | 224/39 |
| 4,436,232 | 3/1984 | Zane et al. | 224/39 |
| 4,562,944 | 1/1986 | Jackson et al. | 224/39 |
| 4,598,847 | 7/1986 | Ames, III | 224/39 |
| 4,620,814 | 11/1986 | May | 403/374 |
| 4,666,071 | 5/1987 | Irwin et al. | 224/32 A |
| 5,076,526 | 12/1991 | Zane et al. | 248/314 |
| 5,127,562 | 7/1992 | Zane et al. | 224/39 |
| 5,251,796 | 10/1993 | Shelhart | 224/39 |
| 5,395,016 | 3/1995 | Minoura | 224/39 |

FOREIGN PATENT DOCUMENTS

| | | | |
|---|---|---|---|
| 4244236 | 12/1992 | Germany | 224/39 |
| 2178383 | 2/1987 | United Kingdom | 224/39 |

OTHER PUBLICATIONS

Tweedo Eco–Lock Carrier; Model Eco–S140 and Model ECO–S10B. No publication date available.
Tweedo "Bagaedragers EEN Velig Gevoel" 3 pages, Brochure, Circa 1994.

*Primary Examiner*—Henry J. Recla
*Assistant Examiner*—Gregory M. Vidovich
*Attorney, Agent, or Firm*—C. G. Nessler

[57] ABSTRACT

A rack for transporting things on a bicycle is configured for storing a shackle lock during use of the bicycle. The rack, which mounts above the rear wheel of a bicycle, has a horizontal platform with a nominal C-shaped cross section comprised of a top having downwardly extending and inwardly curving arms. The shackle of a lock is slidably insertable into the C-shape; the curved arms permit shackles of varying diameter and leg spacing to be stored. Outwardly deflectable arms, or leaf springs captured in lengthwise undercut grooves within the C-shape, press on the shackle to frictionally retain it. The rear end of the platform is angled so that when a shackle lock cross bar contacts it there is a downward force on the cross bar, to stop vertical shaking of the lock. The horizontal stays that hold the platform to the bicycle are slidably adjustable and locked in position by means of set screw cams in grooves running adjacent the grooves receiving the stays.

19 Claims, 3 Drawing Sheets

BICYCLE RACK WITH INTEGRAL LOCK HOLDER

This application is a continuation-in-part of application Ser. No. 08/239,534, filed May 9, 1994, now abandoned.

FIELD OF INVENTION

The present invention relates to racks which can be attached to the rear ends of bicycles, for carrying objects.

BACKGROUND

It has long been a practice to employ a rigid rack, attached to a bicycle frame, for carrying objects. In the familiar structure, as shown for instance in Blackburn U.S. Pat. No. 4,154,382. The rack is comprised of a horizontal structure or platform, mounted above the rear wheel. There is a rigid supporting frame comprised of struts which attach to the drop out part of the bicycle frame, near the rear axle, and a horizontal bracket attaches the platform to a part of the frame underneath the bicycle seat. To fit different bicycles, it is necessary that the bracket be adjustable horizontally and vertically.

Objects to be transported on the bicycle are typically attached to the horizontal platform of a bicycle rack. In addition, panniers—typically semi-rigid bags—are often supported off the platform. See Jackson et al. U.S. Pat. No. 4,562,944, where in one embodiment the panniers are attached to exterior channels in an extruded aluminum horizontal platform.

There are, of course, many other designs of racks, as there is a continuing search for a good combination of functionality, aesthetic appearance, and low manufacturing cost.

Independent of the racks, it has unfortunately become more of a necessity for bicyclists in certain areas of the country to have a lock for securing a bicycle against thieves. One favored type of lock comprises a U-shaped steel shackle. See Zane et al. U.S. Pat. No. 5,010,746 for a modern theft-resistant design of shackle lock. The shackle lock is typically used to secure one or both wheels to a post, such as a lamp post or stanchion.

Having a lock raises the need for conveniently carrying the lock while using the bicycle, especially when is no basket or pannier. Many shackle locks tend to be bulky and heavy. If a lock is simply secured around part of the frame, it can move about, be in the way, make a rattle, and mar the bicycle finish. Thus, inventors have thought of ways to conveniently store such locks during use. Ames III U.S. Pat. No. 4,598,847 discloses using an elastic cord to secure a lock to the frame near the rear wheel. Zane et al. U.S. Pat. No. 5,076,526 discloses a polymeric bracket which clamps to the bicycle frame; a jaw retains the lock.

Both of the lock storing devices seem to have usefulness, but it is desirable that there be even better means for securing of a heavy lock, so that the commonly encountered vibration and shaking do not cause it to move or drop off. It is also desirable of course that the means for storing the lock be made at a reasonably low cost, that it have a pleasing appearance, and that it be adaptable to locks of different shackle length and diameter.

Thus, there is a continuing need for improvements in both bicycle racks and lock storage devices.

SUMMARY

An object of the invention is to provide a means for storing a shackle type lock on a cycle, in particular a bicycle, in combination with having a rack for carrying objects, preferably where the means accomodates locks of different lengths and diameters. A further object of the invention is to provide a lock-storing rack which is adjustable to fit different bicycle frame sizes.

According to the invention, a rack for a cycle having a frame and a wheel is comprised of a C-cross section platform for supporting objects; a means for vertically supporting the platform on the cycle frame; a means for horizontally securing the platform to the cycle frame; and, the platform C-cross section is comprised of two opposing inwardly bent and downwardly extending arms. A shackle lock is slidable into and along part of the length of the platform underside, so the lock is captured and retained within the C-section of the platform Preferably, the means for vertical support of the platform is comprised of two struts welded to the underside of the platform, and bolted to the drop frame near the rear wheel of a bicycle; the horizontal securing is comprised of a pair of rods slidably adjustable lengthwise in grooves in the platform; the arms curve inwardly with a radius which decreases with downward extension of the arms; and, there are resilient means within the C-section proximate the arms, to press on the shackle of a lock, to thereby frictionally retain it in place and lessen shaking. The curved arms enable the device to receive locks of somewhat varying shackle leg spacing and shackle leg diameter.

In another preferred embodiment, the platform has two lengthwise undercut grooves within the C-section, near the arms. The resilient means for pressing on the lock shackle is comprised of a leaf spring captured in each groove; and, the spring is adjustably secured in the groove by a set screw or interference fit. In another preferred embodiment, where the lock shackle dimensions are more surely known, there may be no springs, as the platform cross section is designed to have slight interference fit with the dimensions of the legs of the shackle of the lock. Thus, when the U-shaped shackle is inserted, at least one leg is deflected outwardly, to thereby create a spring-like force on the shackle of the lock and thus frictionally retain it.

Still another preferred embodiment comprises a platform having an angled outer rear end so that, when a shackle lock is inserted fully the lock cross bar which runs transverse to the U-shape shackle contacts the rear end, thus thrusting it downwardly to increase the retaining friction on the shackle and lessen up and down motion of the cross bar.

In another aspect of the invention, the means for securing the platform to the cycle frame is comprised of a rod or stay, preferably rectangular in cross section, which is slidable in a mating first groove running along the platform length. A second circular cross section groove runs parallel to the first groove, and its cross section overlaps the cross section of the first groove. A cam, such as a socket head set screw with a flat along one side, is inserted into the circular groove. In one position, the cam and flat thereon allows the stay rod to slide in its groove. Rotation of the cam in the cam groove causes the unflattened portion, e.g. that having the screw threads, to jam against and dig into both the platform and the stay rod, releasably locking all three elements together. When applied to the horizontal stays, a rack is easily adapted to different sizes of cycles.

The foregoing and other objects, features and advantages of the invention will become more apparent from the following description of the best mode of the invention and accompanying drawings.

DESCRIPTION

Figure 1:
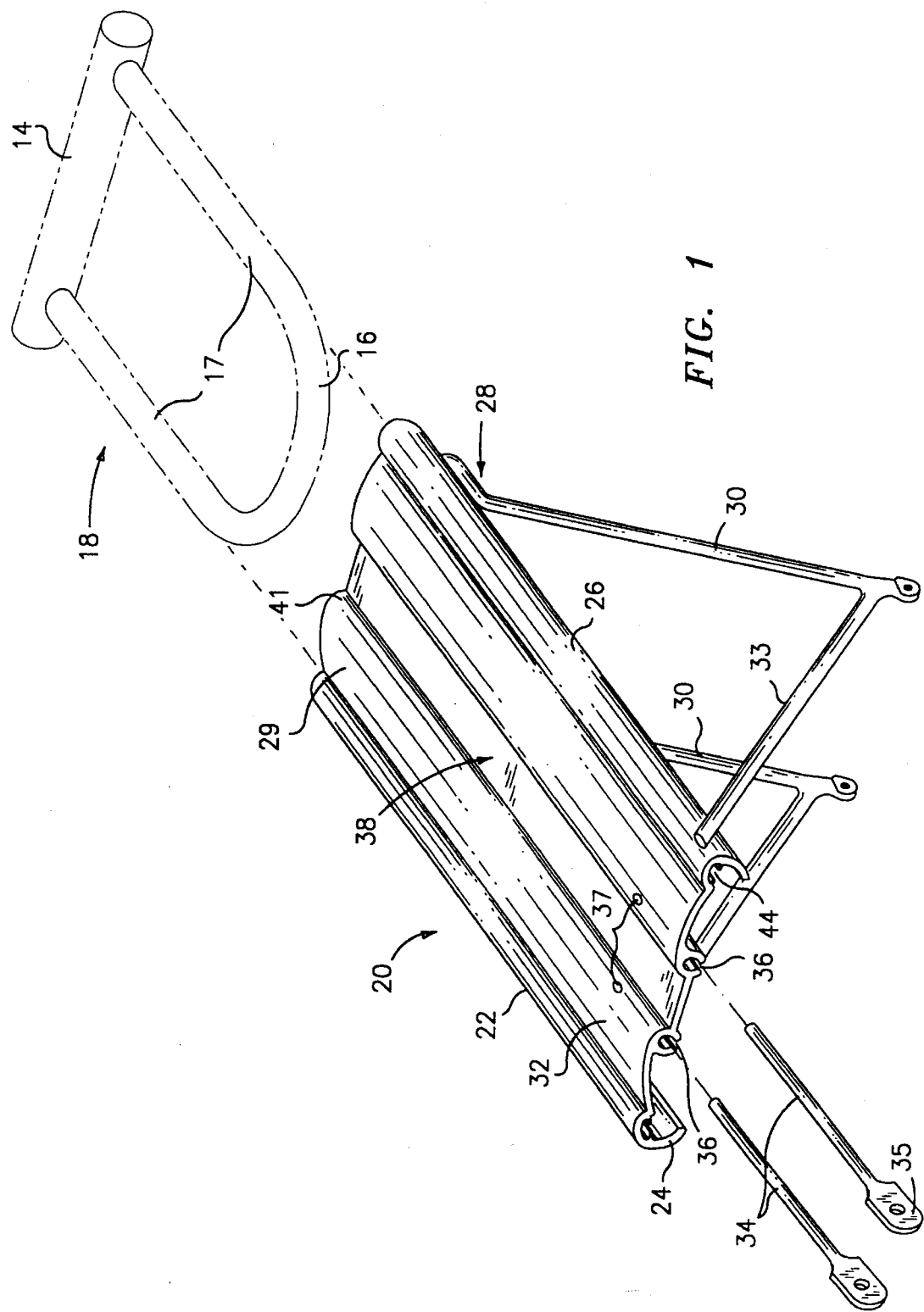
FIG. 1 is a perspective exploded view of a rack and shows how a shackle lock is inserted from its rear end.
Figure 6:
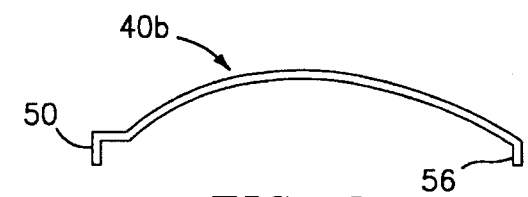
FIG. 6 is a side view of another design leaf spring, one which fits by interference in an undercut groove of the underside of a platform top.

The rack of the present invention mounts on the rear of a bicycle, as is typical of such racks and as is shown in particular in FIG. 1 and 6 of U.S. Pat. No. 4,562,944. The rack of the present invention is useful for storing shackle locks, of the general type referred to in U.S. Pat. No. 5,010,746. The disclosures of both patents are hereby incorporated by reference. The rack is made mostly of extruded, wrought, and welded, black anodized Type 6061-T6 aluminum. Other materials may be used.

While reference herein is made to a bicycle, it should be evident that the invention may be used with cycles generally, including motorcycles and tricycles, and with other noncycle mechanisms where a shackle lock is to be stored.

In the exploded view of FIG. 1, the rack 20 is comprised of a horizontally extending platform 22. The platform is a complex extruded channel, having a nominal C-shape. It is referred sometimes herein as being C-shaped or comprising a C-cross section. A typical shackle type lock 18, shown in phantom, is receivable at the rear end 29 of the platform, within the underside of the C-shaped platform, as indicated by the dashed lines.

The lock 18 is comprised of a U-shaped steel shackle 16 having spaced apart parallel legs 17, to the ends of which is detachably fastened to a somewhat larger diameter keylocking cross bar 14. To store the lock in the rack, the U end of the shackle end is slid longitudinally into and along the channel of the platform underside, within the concavity of the C-shaped cross section, until the cross bar contacts the rear end of the platform. The shackle is held to the platform underside by the inwardly angled arms 24, 26 as described further below.

In a specific embodiment, the rack platform is an extrusion of about 12 inch by 5.5 inch by 1 inch dimension. A U-shape wrought rod 28 is welded to the underside of rear end 29 of the platform, to provide two round struts 30 extending downwardly. The lower ends of the struts are flattened and have through holes, so the ends may be bolted to the drop out part of the bicycle frame near the rear wheel axle. For additional strength, a second pair of welded struts 33 extend from the lower ends of the struts 30 to the front end of the platform. The struts 33 may optionally run further vertically, and then across the upperside of the platform top, to connect with each other and form a stop for parcels carried on the platform.

As shown in FIG. 1, extending from undercut grooves 36 on the underside of the top 38 of the platform, at the front end 32 of the platform, are stays 34, being two round steel rods. To adapt the rack to different dimension bicycles, they are adjustable in extension and fastened by set screws 37 set in tapped holes penetrating the platform top. See FIG. 2 also. The outermost ends 35 of the stays 34 are flattened for attachment to the frame of the bicycle. Typically, in the better installations, there will be bosses, sometimes called "braze-ons" attached to the tubular bicycle frame just beneath the rider's seat. The bosses are made to receive screws or bolts and the flattened ends attach to them. The stays thus secure the rack lengthwise in the horizontal plane of the platform. Other horizontal stays are described further below.

Figure 2:
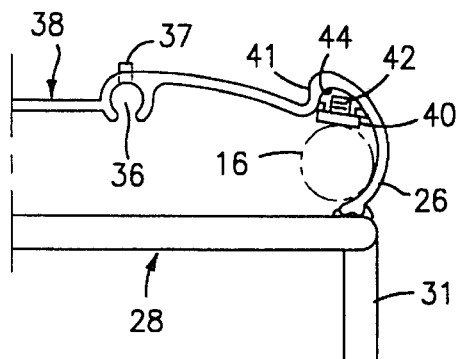
FIG. 2 is an end view of the rack of FIG. 1, as it would be viewed by someone inserting a shackle lock.
Figure 4:
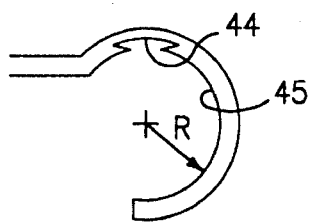
FIG. 4 shows an arm and part of the top of a platform, viewed similarly to the view of FIG. 2.

FIG. 2 and 4 show in more detail the opposing curved arms 24, 26 of the C-shaped cross section of the platform. The arms extend downwardly and inwardly from the top part 38 of the platform to retain the lock shackle 16. The arms are spaced apart a distance appropriate to receive the legs of common lock shackles, which legs are typically about 0.50 inch diameter and about 4.5 inch apart center to center. Commercial shackle lengths vary; typically they are about 9 to 12 inch overall.

The platform arms may extend straight down, with angled lower ends, to retain the shackle. Preferably, they are bent along a curve. (It is the inward bend or curve of the arms that is referred to herein and throughout, as the outside surface of the arm can have any shape as may be desired.) To enable retaining locks of somewhat different dimension, i.e. of different diameter and center to center distance, as shown in FIG. 4, the arc of the interior surface 45 of the arm is shaped like segment of a two dimension spiral; i.e., the radius R of the interior arc of the arm, as shown in FIG. 4, decreases along the length, or downward extension, of the arm. Thus, it more and more sharply curves inwardly, to capture shackles which have smaller dimensions than those of the phantom shackle shown here. In a preferred embodiment, the arc radius changes from about 0.5 inch to 0.3 inch along the nominal 0.7 inch nominal downwardly extending arm length. While the arms preferably run along the whole length of the platform as shown, they may be discontinuous and run lengthwise along only a portion within the generality of the invention.

Figure 5:
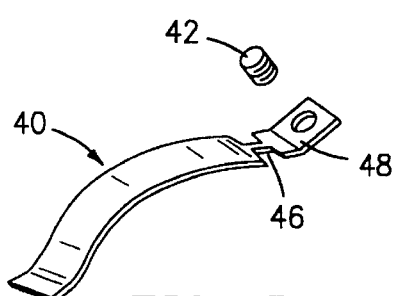
FIG. 5 shows a leaf spring and set screw.

When the platform is horizontally mounted, and during normal use of the bicycle, the lock must be retained, to keep it from sliding out and from vibrating and making noise, etc. Preferably, a leaf spring 40 is adjustably positioned along a groove 44 on underside of the top 38 of the platform, adjacent each arm, so that a spring presses downwardly on each shackle leg 16. One spring 40 is shown in more detail in FIG. 5. It is comprised of nominal 0.015 inch thick by 0.32 inch wide by 3 inch long spring steel. It has a smaller width shank portion 46 and a tab end 48 having a hole. The tab end is twistably inserted or slid into the groove and the spring is retained as the opposing edges of the undercut groove 44 capture the reduced width shank. A set screw 42 threads into a hole of the tab 48 at one end of the spring to tighten and wedge the tab in the groove at the desired longitudinal position. Typically, the spring will be about 5 inch from the outer part of the rear end of the platform.

Figure 7:
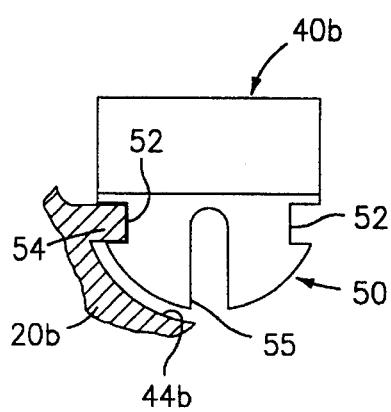
FIG. 7 is an end view of the spring of FIG. 6, inserted in the groove of a platform.
Figure 8:
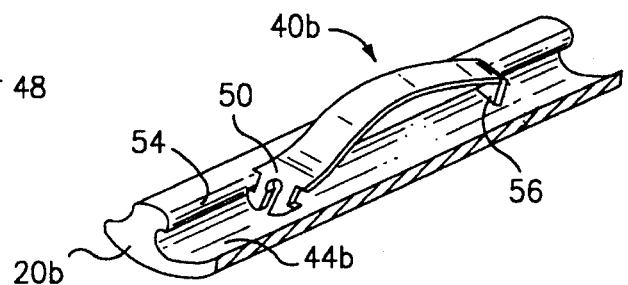
FIG. 8 is a perspective view of the spring of FIG. 6, showing it inserted in the undercut groove of an upside down platform.

Another spring design is shown in FIG. 6–8. In FIG. 8 the spring 40b is shown fitted in the groove 44b of a platform 20b which is shown turned upside down, compared to the view of FIG. 1–3. The spring 40b has an end 50 shaped as a nominal arrow head, as seen from FIG. 7. Opposing cutouts 52 at the end 50 engage the opposing side channels 54 (one only shown in the cutaway view) of the groove 44b. To place the spring in the groove 44b, it is first rotated at an angle to the length of the groove, the end 50 is inserted into the slot; then the spring is rotated to make its length parallel with the groove as shown in FIG. 8. The tang 56 at the opposing spring end snaps into the groove. The spacing between the bottoms of the slots 52 is chosen so that when the end 50 is rotated in the groove the edges of the spring slot wedge and bite into the softer aluminum of the side channels 52 of the groove. Slot 55 enables a slight compression of the width of the "arrow head" when the fit is very tight.

Other means may be used to longitudinally retain the lock shackle in the C-shaped cross section, and keep it from rattling, including friction pads of resilient material such as rubber, other kinds of springs, spring loaded detents which capture the curved end of the U-shape shackle lock, manual clamps, elastic cords, flaps, hook and pile fabric fasteners, and so forth. Of course, in some special installation, the platform may be mounted at an angle to the vertical so that only gravity will comprise the means for retaining the lock.

Figure 3:
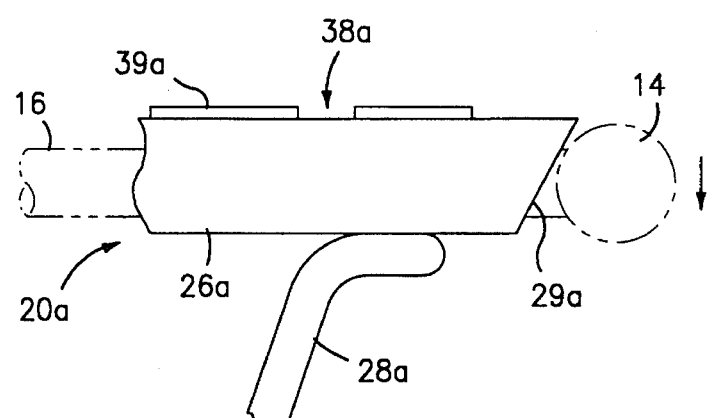
FIG. 3 shows a rack having an angled platform rear end.

Another embodiment within the invention comprises angling in the vertical plane of the outermost edge 29a of the rear end of the platform 20a, as shown in FIG. 3. The edge 29a is sloped, preferably with a 30 degree angle to the vertical, so that the downward most end of the arm 26a is shorter in length than is the top 38a of the platform 20a. A lock is shown in phantom, after it has been inserted into its storage position in the underside of the platform. When the shackle 16 is pushed forward as far as possible, the lock cross bar 14 contacts the platform end 29a and is thrust downwardly. The frictional engagement of the shackle with the springs or other retention means of the platform causes the downward thrust to be maintained. Thus, potential for rattling of the lock, especially the cross bar end, is decreased.

Figure 9:
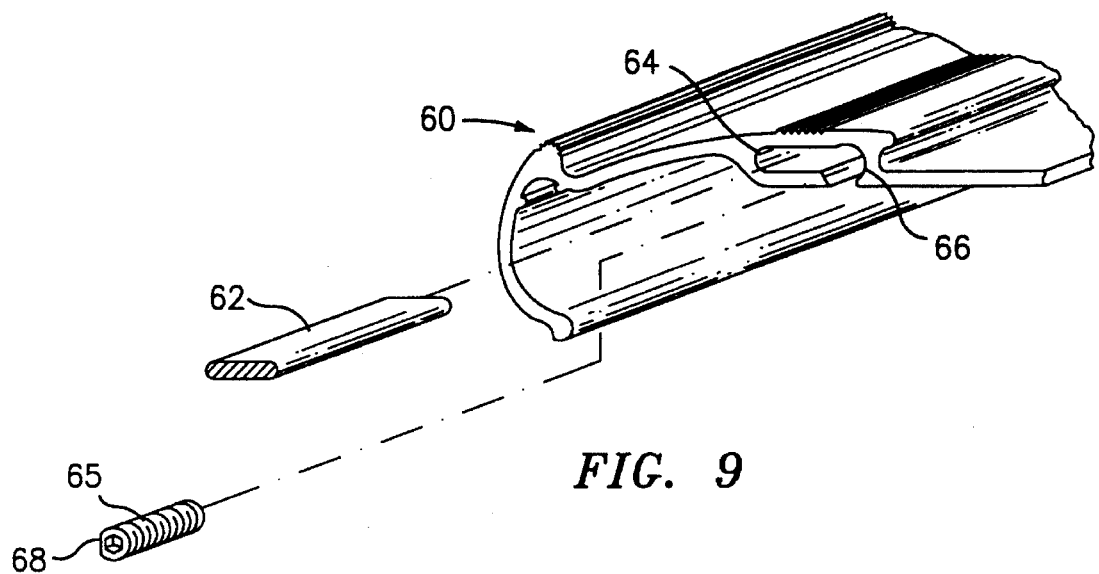
FIG. 9 is a perspective view of the end of a platform, a rectangular horizontal stay, and a locking screw.
Figure 10:
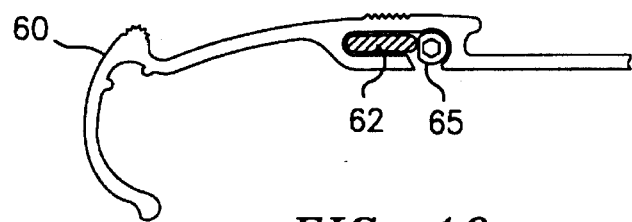
FIG. 10 shows an end view of the platform of FIG. 9 with the stay and screw in place, when the stay is slidable.
Figure 11:
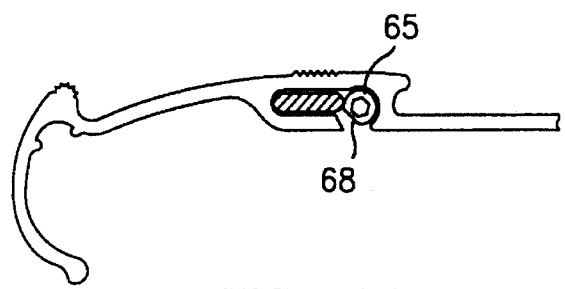
FIG. 11 is like FIG. 10, but shows the screw rotated into the position which locks the stay.

FIG. 9–11 show half of an extruded platform 60 having a different design of horizontal stay retention than described above. Typical horizontal stay 62 is rectangular cross section aluminum rod having heavy rounding of the corners. Rectangular groove 64 is shaped to slidably receive the stay. Adjacent the groove 64 is parallel-running circular groove 66, positioned so the cross sections of the two grooves overlap intersect. The groove 66 is shaped to slidably receive ¼ inch diameter socket head set screw 68. FIG. 10 shows the stay 62 and screw 64 as they are positioned and lengthwise slidable within their respective grooves. Screw 65 has a portion of the screw thread ground away, to create a flat running along its length. When the flat is rotated to face the rectangular groove, as shown in FIG. 10, the stay can slide in its groove despite the interference of the groove cross sections. FIG. 11 shows how screw 65 has been partially rotated, so that the threads of the screw have dug into both the stay and the wall of the screw groove. The stay has been forced sideways in its groove, against the wall opposite the side where the screw groove is located. The stay is thus locked in place frictionally and mechanically. Reverse rotation of the screw will release the stay so it may be removed or readjusted. In the generality of the invention, the screw is a cam rotatable about the axis of the groove, the cam having any variety of shape to accomplish the wedging action described. Preferably the cam is circumferentially ribbed, most preferably, threaded, so wedging also causes mechanical interlocking. The stay cross section and mating stay groove may be non-rectangular, e.g., round.

The design of FIG. 9–11 also conveniently allows the alternative use of round stays, used and secured as described in connection with FIG. 1, as they may be inserted into the groove intended for the cam. While the preferred use of the two-groove and cam design is for the horizontal stays of a rack with lock carrying feature, this aspect of the invention may be applied more generally to securing other artiles to bicycles and things. It may be applied to the vertical struts of a rack, with addition of suitable downardly extending structure to the platform.

Other horizontal securing means may be used, such as slidable flat bars and screw clamps, as are various taught by art, including where horizontal and vertical means for securing are integrated into a unitary structure. When a bicycle is specially designed for a specific platform rack, the means for securing can comprise a simple clamp, bolt hole, bolt, screw, etc., as there may be no need for adjustability.

Other rack embodiments are within the scope of invention. If the platform is designed for a lock of specific known dimensions, of course somewhat simpler shapes cross section shapes can be used within the essential invention. For instance, the radius of the arm arc may be constant, the arm may be have a sharp inside angle instead of a smooth curve, or the inward bend of the arm may be simply be an angling of the arm relative to the nominal plane of the platform.

Where the rack is sold in combination with a lock, or for a particular design lock, a slight interference fit can be accomplished between the spaced apart shackle legs and the arms which receive the U-shape shackle. Thus, on forcing the shackle into the C-section, there will be a resilient force from the slightly outwardly-deflected arms, as the platform extrusion deforms. The force will frictionally keep the lock in place. In the generality of the invention, one or both arms may be designed to resiliently deflect. Less preferably, one or both arms may deflect at a hinge.

The platform 20a of FIG. 3 has raised protuberances 39a to help secure things to the surface. Lengthwise shallow grooves and other surface texture features are likewise useful. Panniers may be secured to the platform of the rack by mechanisms like those known in the art. The pannier securing mechanism will engage the edge 41 of a raised part of the platform top, and the pannier will hang over the side of the platform and along the bicycle rear wheel.

Of course, the platform of the rack may be affixed to, or integrated within, objects other than cycles, where there is a need to store and retain a shackle lock.

Although only the preferred embodiment has been described with some alternatives, it will be understood that further changes in form and detail may be made without departing from the spirit and scope of the claimed invention.

I claim:

1. A rack, for attachment to a cycle having a frame and wheel, and for carrying a shackle lock comprised of a U-shape shackle and a cross bar engaged on the open end of the U-shape shackle, comprising:

a platform having a top opposing sides, a rear end and a front end spaced apart along the length of the platform;

means for vertically supporting the platform on the cycle frame with the top in a horizontal position for supporting articles thereon above the cycle wheel, connected to the platform;

means for horizontally securing the platform to the cycle frame, connected to the platform;

a C-shaped cross section in a vertical plane intersecting the platform top comprised of the platform top and two opposing downwardly extending arms respectively running lengthwise along the opposing sides of the platform; the extremities of the arms angled inwardly toward the center of the platform, the C-shaped cross section shaped to receive and retain the shackle lock; wherein the shackle of the lock is insertable into and removable from the C-shaped cross section at the rear end of the platform, without disengagement of the cross bar from the shackle, by sliding the shackle lengthwise along the platform.

2. The rack of claim 1 further comprising means for retaining the shackle lock within the C-shaped cross section of the platform, to inhibit longitudinal motion of the lock.

3. The rack of claim 1 wherein the means for horizontally securing the rack to the frame comprises at least one slidably adjustable rod engaged with the front end of the platform.

4. The rack of claim 3 comprising a platform having a first lengthwise groove in which said at least one slidably adjustable rod is partially captured and slidable; the platform having a second lengthwise groove adjacent to and running parallel to the first groove, the second groove cross section overlapping the first groove cross section; the rack further comprising a cam positioned in the second groove and rotatable about the lengthwise axis of the second groove, the cam having a first cam rotational position whereat the rod is slidable along a portion of the length of the first groove, and a second cam rotational position whereat a portion of the cam intrudes on the cross section of the first groove, to thereby press against the rod portion captured in the first groove and inhibit sliding of the rod therein.

5. The rack of claim 4 wherein the cam is a set screw having a flat along one side thereof.

6. The rack of claim 5 wherein the rod is rectangular in cross section.

7. The rack of claim 2 wherein the means for retaining the shackle lock comprises resilient means for frictionally engaging the shackle of the lock.

8. The rack of claim 7 wherein the means for frictionally engaging comprises a leaf spring.

9. The rack of claim 8 wherein the platform has a lengthwise undercut groove within the concavity of the C-shaped shaped cross section, proximate one of said arms; and, wherein the spring is a leaf spring having one end fitted and captured within the undercut of the groove, the spring positioned to press on the shackle of lock which is slidably inserted within the C-shaped shaped cross section.

10. The rack of claim 9 wherein the spring has a screw hole at the one end; further comprising a screw in the screw hole, to frictionally lock the spring lengthwise within the undercut groove.

11. The rack of claim 9 wherein the one end of the spring is shaped to be insertable into the groove, the one end forming an interference fit with the edges of the groove and locking the spring lengthwise in the undercut groove.

12. The rack of claim 11 wherein the one end of the spring has a nominal arrowhead shape; and wherein the opposing other end of the spring comprises a tang fitted into the groove to hold the spring parallel to the groove.

13. The rack of claim 1 wherein said arms curve inwardly toward each other as they extend downwardly and the radius of the curve of each arm decreases along the downward extension of the arm.

14. The rack of claim 1 characterized by at least one of said arms being outwardly deflectable, so when the shackle is inserted into the interior of the C-shaped cross section, said at least one of said arms resiliently deflects with a resisting force, the resisting force pressing on the shackle, to frictionally restrain the lock longitudinally in place.

15. The rack of claim 2 characterized by the platform rear end having an angle to the vertical plane, wherein the platform length at the downwardmost extension of the arms is shorter than the length at the platform top immediately thereabove, to wedge downwardly the cross bar of the shackle lock when it is in contact with the rear end and thereby lessen any tendency for the shackle lock to vibrate within the C-shaped cross section.

16. The rack of claim 1 characterized by the top of the platform having an upper surface longitudinal rib, adapted for engaging a pannier attaching device.

17. A rack for attachment to a bicycle having a frame and a rear wheel, comprising:

a platform for mounting above the bicycle rear wheel to support objects thereon, the platform having a top, length, rear end and opposing front end;

means connected to the platform, for vertically supporting the platform on the bicycle frame;

longitudinally adjustable means for horizontally securing the platform to the frame, connected to the front end of the platform;

the platform having a C-shaped cross section comprised of said platform top and two opposing downwardly extending arms running lengthwise along opposing sides of the platform; a portion of the interior surface of each arm angled inwardly along a curve; the curve of each arm having a radius which decreases with downward extension of each of said arms;

the platform having two undercut grooves running lengthwise along the top within the concavity of the C-shaped section, one each proximate an opposing arm; and, leaf springs, fastened within the undercut of each of the grooves, each spring longitudinally adjustable along a portion of the length of each groove and adapted to press on a shackle lock resting within the C-shaped section of the platform.

18. Apparatus for mounting articles on a cycle comprised of a platform, having a first lengthwise groove for slidably receiving a rod, and a second lengthwise groove running adjacent to and parallel to the first groove the second groove having a circular cross section overlaping the first groove cross section;

means for adjustably connecting the platform to the cycle comprised of:
a rod slidably fitted in the platform first groove;
a cam positioned in the second groove and rotatable about the lengthwise axis thereof, the cam having a cross section such that in a first cam rotational position, the rod is slidable along the length of the first groove, and a second cam rotational position, a portion of the cam intrudes into the cross section of the first groove, to thereby press against the rod and inhibit sliding of the rod in the first groove.

19. The apparatus of claim 18 characterized by a cam having circumferential ribbing, the cam having a flat running along the length of the cam axis of rotation, wherein rotation of the cam to said second rotational position causes the ribbing of the cam to deform the surface of the second groove and the rod where they are contacted by the cam.

* * * * *